United States Patent [19] [11] Patent Number: 4,975,540
Hähnle et al. [45] Date of Patent: Dec. 4, 1990

[54] WATER-SOLUBLE DISAZO DYESTUFFS CONTAINING A VINYLSULFONYL OR B-SULFATOETHYLSULFONYL-SUBSTITUTED NITROPHENYLAMINO GROUP, SUITABLE AS DYESTUFFS

[75] Inventors: Reinhard Hähnle; Hartmut Springer, both of Taunus, Fed. Rep. of Germany

[73] Assignee: Hoechst Aktiengesellschaft, Frankfurt am Main, Fed. Rep. of Germany

[21] Appl. No.: 300,072

[22] Filed: Jan. 19, 1989

[30] Foreign Application Priority Data

Jan. 23, 1988 [DE] Fed. Rep. of Germany ....... 3801997

[51] Int. Cl.$^5$ ................... C09B 62/513; D06P 1/384; D06P 3/66; D06P 3/24
[52] U.S. Cl. .................. 534/642; 534/582; 534/887; 534/583
[58] Field of Search ......................... 534/642

[56] References Cited

U.S. PATENT DOCUMENTS

| 2,657,205 | 10/1953 | Heyna et al. | 534/642 |
| 4,257,770 | 3/1981 | Nishimura et al. | 534/642 |
| 4,464,297 | 8/1984 | Omura et al. | 534/642 |
| 4,492,654 | 1/1985 | Hoyer et al. | 534/642 |
| 4,701,523 | 10/1987 | Segal et al. | 534/642 X |
| 4,818,814 | 4/1989 | Schlafer | 534/642 |

FOREIGN PATENT DOCUMENTS

| 0063276 | 6/1984 | European Pat. Off. | |
| 0197418 | 10/1986 | European Pat. Off. | 534/642 |
| 965902 | 6/1957 | Fed. Rep. of Germany. | |
| 3113989 | 11/1982 | Fed. Rep. of Germany. | |
| 3317383 | 11/1984 | Fed. Rep. of Germany | 534/642 |
| 1183661 | 3/1970 | United Kingdom. | |

Primary Examiner—Floyd D. Higel
Assistant Examiner—Fiona T. Powers

[57] ABSTRACT

Disazo compounds conforming to the general formula (1) below and suitable for use as fiber-reactive dyes for the dyeing of carboxamido-containing and/or hydroxy-containing materials such as wool and, in particular, cellulose fiber materials, in navy hues having good fastness properties

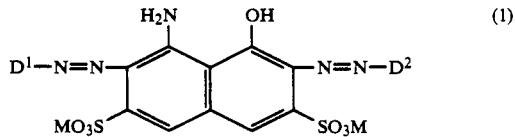 (1)

in which
M is a hydrogen atom or an alkali metal or alkaline earth metal,
$D^1$ is a phenyl radical which can be substituted by substituents from the group consisting of chlorine, bromine, sulfo, alkyl and alkoxy and additionally by a vinylsulfonyl or β-sulfatoethylsulfonyl group or by a group of the general formula (3)

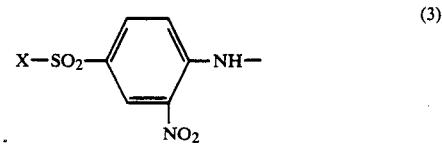

(3)

where X is a vinyl or β-sulfatoethyl group;
$D^2$ is a radical of the general formula (4)

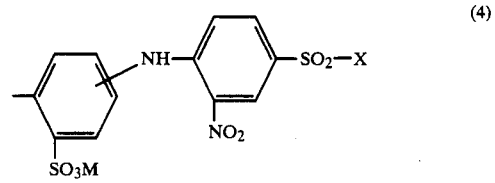

(4)

in which M and X have one of the abovementioned meanings and the amino group —NH— is bound to the benzene ring in the para-position with respect to the sulfo group —$SO_3M$ or in the paara-position with respect to the free bond.

5 Claims, No Drawings

WATER-SOLUBLE DISAZO DYESTUFFS CONTAINING A VINYLSULFONYL OR B-SULFATOETHYLSULFONYL-SUBSTITUTED NITROPHENYLAMINO GROUP, SUITABLE AS DYESTUFFS

The invention is in the technical field of fiber-reactive disazo dyes.

Example 50 of German Patent No. 965,902 and furthermore U.S. Pat. Nos. 2,657,205, 4,257,770 and 4,492,654, British Patent No. 1,183,661, German Offenlegungsschrift No. 3,113,989 and European Patent No. 0,063,276B have disclosed disazo compounds which have fiber-reactive dye properties and are synthesized from 1-amino-8-naphthol-3,6-disulfonic acid as bivalent coupling component and having a diazo component coupled under acidic conditions and one coupled under neutral conditions, at least one of which contains a fiber-reactive group from the vinylsulfone series.

Novel, useful disazo compounds have now been found, which have improved properties and conform to the general formula (1)

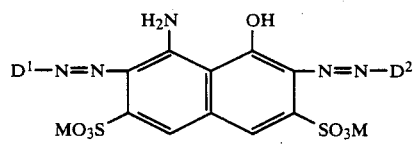

in which

M is a hydrogen atom or an alkali metal such as sodium, potassium or lithium, or is the equivalent of an alkaline earth metal such as of calcium, alkali metal;

$D^1$ is a radical of the general formula (2)

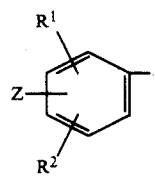

in which $R^1$ is a hydrogen, chlorine or bromine atom or is a sulfo group, an alkyl group of 1 to 4 carbon atoms such as the ethyl group and in particular methyl group, or is an alkoxy group of 1 to 4 carbon atoms such as the ethoxy and the methoxy group, $R_2$ is a hydrogen, chlorine or bromine atom or is a sulfo group, an alkyl group of 1 to 4 carbon atoms such as the ethyl group and in particular methyl group, or is a n alkoxy group of 1 to 4 carbon atoms such as the ethoxy group and the methoxy group, and Z is a group of the general formula $X-SO_2-$ in which X denotes the vinyl group or a $\beta$-sulfatoethyl group, or Z is a hydrogen atom or a sulfo group or a group of the general formula (3)

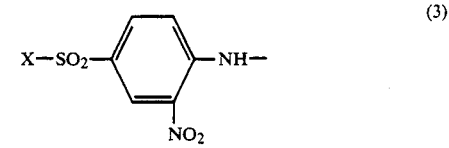

in which X has one of the above meanings; $D^2$ is a radical of the general formula (4)

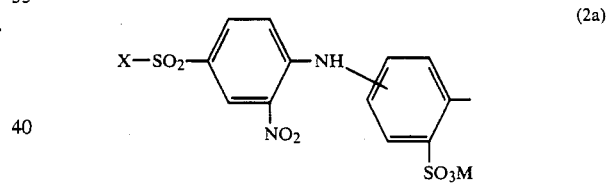

in which M and X have one of the abovementioned meanings and the amino group —NH— is bound to the benzene ring in the para-position with respect to the sulfo group —$SO_3M$ or in the para-position with respect to the free bond; the formula members $D^1$ and $D^2$ and also the formula members and $R^1$ and $R^2$ also the two X can each have meanings identical to one another or different from one another.

Preferably $D^1$ is a radical of the general formula (2) in which Z stands for the group of the formula $X-SO_2-$. Preferably X denotes a $\beta$-sulfatoethyl group. If Z in the radical of the general formula (2) is a group of the general formula (3), the radical of the general formula (2) is preferably a radical of the general formula (2a)

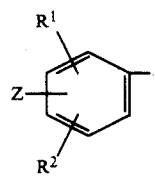

(2a)

in which M and X have one of the abovementioned meanings and the amino group —NH— is bound to the benzene ring in the para-position with respect to the sulfo group —$SO_3M$ or in the para-position with respect to the free bond.

If Z in the radical of the general formula (2) is a group conforming to the general formula $X-SO_2-$, $R^1$ is preferably a hydrogen atom or a methoxy group and $R^2$ is preferably a hydrogen atom or a chlorine atom or a methyl group or methoxy group.

In particular, a disazo compound according to the invention which can be mentioned is one in which $D^1$ is the 4-($\beta$-sulfatoethylsulfonyl)phenyl group and $D^2$ is the 2-sulfo-5-[2'-nitro-4'-($\beta$-sulfatoethylsulfonyl)-phenylamino]phenyl group.

The substituents "sulfo", "carboxy" and "sulfato" include not only their acid form but also their salt form. Accordingly sulfo groups denote groups conforming to the general formula —$SO_3M$, carboxy groups, groups conforming to the general formula —COOM and sulfato groups, conforming to the general formula —O-$SO_3M$ in which M has one of the abovementioned meanings.

The novel azo compounds can be present in an acid form and in the form of their salts. Preferably they are in the form of their salts and are used preferably in the form of these salts for dyeing (here and hereinafter understood in its general meaning and including printing) hydroxy- and/or carboxamido-containing materials, in particular fiber materials.

The present invention furthermore relates to a process for the preparation of disazo compounds of the general formula (1), which comprises coupling a monoazo compound of the general formula (5)

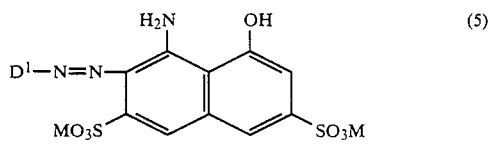

in which $D^1$ and M have one of the abovementioned meanings with a diazonium salt of an aromatic amine of the general formula $D^2$—$NH_2$, where $D^2$ has one of the abovementioned meanings, at a pH between 4 and 7.5, preferably between 5 and 6.5, in an aqueous or aqueous-organic medium, but preferably aqueous medium. As a rule, the coupling reaction is carried out at a temperature between 0 and 30° C.

Disazo compounds of the general formula (1) in which the formula radical(s) X each stand for a vinyl group can be prepared according to the invention also by reacting a disazo compound of the general formula (1) in which one or both formula radicals X denote a β-sulfatoethyl group in an aqueous solution at a pH between 10 and 12, preferably between 10.5 and 11.5, with an alkali such as sodium hydroxide. The reaction is carried out at a temperature between 15 and 50° C, preferably between 20 and 40° C, the reaction time usually being 5 to 20 minutes; at the higher temperatures within the temperature range given, a shorter reaction time within the time range given must be maintained to avoid the disadvantageous formation of β-hydroxyethylsulfonyl groups.

The starting compounds of the general formula (5) are synthesized by generally known methods by the coupling reaction of 1-amino-3,6-disulfo-8-naphthol with a diazonium salt of an aromatic amine of the general formula $D^1$—$NH_2$, where $D^1$ has the abovementioned meaning, in a strongly acidic aqueous medium. The starting compounds conforming to the general formula $D^1$—$NH_2$ have been described numerous times in the literature, for example in U.S. Pat. No. 4,701,523. Likewise the aminodiphenylamine compounds conforming to the general formulae $D^2$—$NH_2$ and $D^1$—$NH_2$, where Z is identical to a radical of the general formula (3), have been described in this U.S. Patent in columns 5 and 6 or can be synthesized analogously to instructions given there.

The disazo compounds of the general formula (1) prepared according to the invention can be precipitated and isolated from the synthesis solutions by generally known methods, thus, for example, either by precipitation from the reaction medium by means of electrolytes such as, for example, sodium chloride or potassium chloride, or by evaporation of the reaction solution, for example spray-drying, it being possible to add a buffer substance to the synthesis solution.

The disazo compounds according to the invention of the general formula (1) —hereinafter designated as compounds (1) —have, as already mentioned, fiber-reactive dye properties. They can therefore be used for dyeing hydroxy TM TM and/or carboxamido-containing materials, in particular fiber materials. It is also possible to add the solutions which are formed during the synthesis of compounds (1), if necessary after the addition of a buffer substance and if necessary even after concentration, directly as liquid formulations for dyeing.

The present invention therefore also relates to the use of compounds (1) for dyeing hydroxy and/or carboxamido-containing materials or to processes to apply them on these substrates. Preferably the materials are used in the form of fiber materials, in particular in the form of textile fibers such as yarns, wound packages and fabrics. This can be done analogously to known procedures.

Hydroxy containing materials are those of natural or synthetic origin such as, for example cellulose fiber materials or regeneration products thereof and polyvinyl alcohols. Cellulose fiber materials are preferably cotton, but also other plant fibers such as linen, hemp, jute and ramiefiber; regenerated cellulose fibers are, for example, staple viscose and filament viscose.

Carboxamido-containing materials are, for example, synthetic and natural polyamides and polyurethanes, in particular in the form of fibers, for example wool and other animal hair, silk, leather, nylon 6,6, nylon 6, nylon 11 and nylon 4.

The compounds (1) can be, in accordance with the use according to the invention, be applied to and fixed on the substrates mentioned, in particular to and on the fiber materials mentioned, by the application procedures known for water-soluble dyes, in particular for fiber-reactive dyes, for example by applying a compound (1) in dissolved form to the substrate or incorporating it therein and fixing it on this or in this substrate by the action of heat and/or by the action of an agent having an alkaline action. Such dyeing and fixation methods have been described numerous times not only in the technical but also in the patent literature such as, for example in U.S. Pat. No. 4,492,654 already mentioned at the beginning.

Using compounds (1), strong navy to bluish black or greenish black or purely black dyeings and prints having good fastness properties can be prepared not only on carboxamido-containing materials but also on hydroxyl-containing material, such as in particular cellulose fiber material. In addition to the good light fastness of the dry dyed material and of the dyed material which has been moistened by drinking water or an alkaline or acidic perspiration solution, the good wet fastness properties, in particular the good wash, chlorine water, water, seawater, acid and alkali fastness properties and also the good acid and alkaline cross-dyeing and acid and alkaline perspiration fastness properties should be mentioned in particular. Compounds (1) are distinguished by good color build-up and by high degrees of fixation.

The Examples which follow serve to illustrate the invention. Parts and percentages are by weight, unless stated otherwise. Parts by weight relate to parts by volume such as the kilogram to the liter.

The compounds described in these Examples by the formula are given in the form of the free acids; in general, they are prepared and isolated in the form of their sodium or potassium salts and are used for dyeing in the form of their salts. Likewise, the starting compounds and components mentioned in the Examples which follow, in particular in the Table Examples, in the form of the free acid can be used in the synthesis as such or in the form of their salts, preferably alkali metal salts such as sodium or potassium salts. The absorption maxima ($\lambda_{max}$ values) given for the visible region were determined at 20° C. on the aqueous solution of the alkali metal salts.

EXAMPLE 1

An aqueous solution [preparation described below]of the diazonium salt of 102 parts of 2-nitro-4-($\beta$-sulfato-ethyl-sulfonyl)-4'-sulfo-3'-aminodiphenylamine is added to an aqueous suspension of 121 parts of a monoazo compound (obtainable by acid coupling reaction of equivalent amounts of 1-amino-3,6-disulfo-8-naphthol and 4-$\beta$-sulfatoethylsulfonylaniline) in about 800 parts of water at a pH of 1.5 to 2; the coupling reaction is carried out at a pH between 6 and 6.5 and a temperature between 5 and 25° C [the diazonium salt is prepared by dissolving 102 o 30 parts of 2-nitro-4-('-sulfatoethylsulfonyl)-3'-amino-diphenylamine-4'-sulfonic acid in 1000 parts of water at a pH between 6.0 and 6.5 with the addition of sodium bicarbonate, then adding 36.2 parts of a 40% strength aqueous sodium nitrite solution and 300 parts of ice and then rapidly adding 100 parts of a 31% strength aqueous hydrochloric acid solution to this mixture with stirring; stirring is continued for another hour at 0 to 5° C, and excess nitrous acid is destroyed in the usual manner with a small amount of sulfamic acid]. After the second coupling reaction has been completed, the reaction batch is set to a pH of 5 with phosphoric acid and evaporated to dryness under reduced pressure. This gives a black electrolyte-containing powder of the sodium salt of the compound of the formula

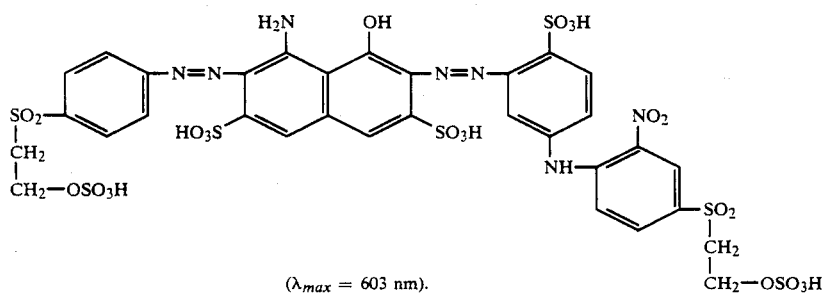

($\lambda_{max}$ = 603 nm).

The disazo compound according to the invention shows very good fiber-reactive dye properties and produces, on the materials mentioned in the description such as, in particular cellulose fibre materials, for example cotton, with the application and fixation methods customary in the art, in particular the application conditions customary for fiber-reactive dyes, navy dyeings having good fastness properties, of which in particular the good light fastness properties of the dry dyed material and also of the dyed material which has been moistened with drinking water or a perspiration solution; and also the good wash and chlorine fastness properties should be mentioned in particular.

EXAMPLE 2

Starting from the disazo compound according to the invention of Example 1, 100 parts of this disazo compound are dissolved in 500 parts of water at 20 to 25° C. By adding a 33% strength aqueous sodium hydroxide solution, a pH of 11 is set and maintained for 10 minutes at a temperature of 25° C. Glacial acetic acid is then added to the batch to set a pH of 5, 120 parts of sodium chloride are added, and stirring of the batch is continued for two to three hours. The disazo compound salted out is filtered off, washed with a 20% strength aqueous sodium chloride solution and dried at about 60° C under reduced pressure. This gives the disazo compound according to the invention of the formula

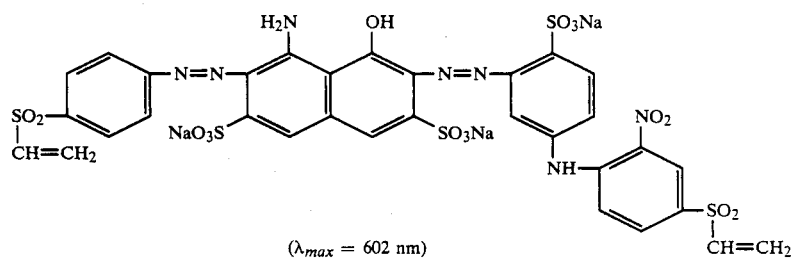

($\lambda_{max}$ = 602 nm)

as an electrolyte containing (sodium chloride containing) black powder. This disazo compound according to the invention likewise has very good fiber-reactive dye properties and produces, by the application methods customary for fiber-reactive dyes, navy dyeings having the good properties mentioned for the disazo compound according to the invention of Example 1.

EXAMPLE 3

250 parts of ice and then 35 parts of a 40% strength aqueous sodium nitrite solution are added to a solution of 36.6 parts of 4-vinylsulfonylaniline in 500 parts of water and 65 parts of a 31% strength aqueous hydrochloric acid. After excess nitrous acid has been destroyed with sulfamic acid, 63 parts of 1-amino-8-hydroxynaphthalene-3,6-disulfonic acid are added to this diazonium salt suspension, and the coupling reaction is continued for another hour with stirring at a temperature between 3 and 8° C; finally, the pH is brought to 1.5 to 1.8 with sodium bicarbonate, and stirring is continued for another three hours at 5 to 12° C.

The solution of the diazo component described in Example 1 is added to the suspension of the monoazo compound thus prepared, and the coupling reaction is carried out under the conditions mentioned in Example 1.

The disazo compound according to the invention is isolated in the usual manner, for example by salting it out with sodium chloride or by evaporation, such as, for example, by spray-drying. This gives the disazo compound according to the invention of the formula (written in the form of the free acid)

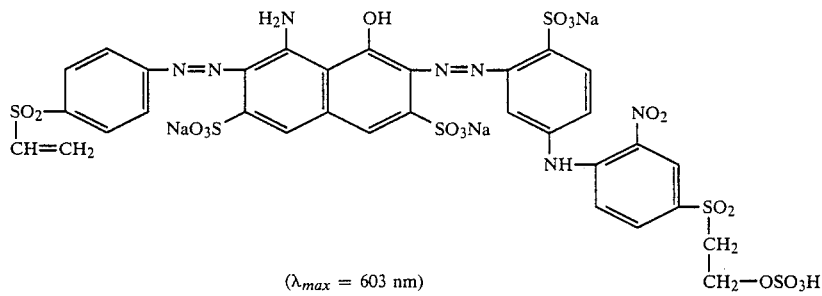

($\lambda_{max}$ = 603 nm)

as an electrolyte containing (such as, for example sodium chloride containing) black powder. This disazo compound according to the invention also has very good fiber-reactive dye properties and produces, for example on cotton, strong navy dyeings having the good properties mentioned for the disazo compound according to the invention of Example 1.

EXAMPLES 4 TO 23

In the Table Examples which follow, further disazo compounds according to the invention conforming to a general formula (A)

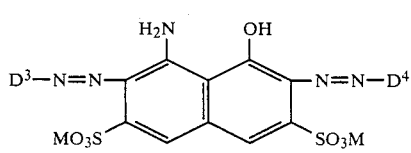

are described by means of their components (M having one of the meanings mentioned in the description and preferably being an alkali metal). They can be prepared in a manner according to the invention, such as, for example, by one of the procedures described in the previous Working Examples, from the components evident from formula (A). They have very good fiber-reactive dye properties and produce, on the materials mentioned in the description, such as, in particular, cellulose fiber materials, for example cotton, strong dyeings and prints having good fastness properties and the hue (in this case for a cotton dyeing) mentioned in the particular Table Example. The numbers in parentheses indicate the absorption maximum in nm.

| | Disazo compound according to formula (A) | | |
|---|---|---|---|
| Ex. | Radical D³- | Radical D⁴- | Hue |
| 4 | 2-Sulfo-4-[2'-nitro-4'-(β-sulfatoethyl-sulfonyl)phenyl-amino]phenyl | 2-Sulfo-4'-[2'-nitro-4'-(β-sulfatoethyl-sulfonyl)phenyl-amino]phenyl | navy (623) |
| 5 | 2-Bromo-4-(β-sulfato-ethylsulfonyl)phenyl | 2-Sulfo-5-[2'-nitro-4'-(β-sulfatoethyl-sulfonyl)phenyl-amino]phenyl | navy (616) |
| 6 | 2-Methoxy-4-(β-sul-fatoethylsulfonyl)-phenyl | 2-Sulfo-5-[2'-nitro-4'-(β-sulfatoethyl-sulfonyl)phenyl-amino]phenyl | navy (621) |
| 7 | 4-Vinylsulfonyl-phenyl | 2-Sulfo-4-[2'-nitro-4'-(β-sulfatoethyl-sulfonyl)phenyl-amino]phenyl | navy (613) |
| 8 | 2-Chloro-5-(β-sulfato-ethylsulfonyl)phenyl | 2-Sulfo-5-[2'-nitro-4'-(β-sulfatoethyl-sulfonyl)phenyl-amino]phenyl | navy (618) |
| 9 | 2-Bromo-4-(β-sulfato-ethylsulfonyl)phenyl | 2-Sulfo-4-[2'-nitro-4'-(β-sulfatoethyl-sulfonyl)phenyl-amino]phenyl | navy (624) |
| 10 | 2-Sulfo-4-vinylsul-fonylphenyl | 2-Sulfo-5-[2'-nitro-4'-(β-sulfatoethyl-sulfonyl)phenyl-amino]phenyl | greenish navy (622) |
| 11 | 2-Sulfo-4-(β-sulfato-ethylsulfonyl)phenyl | 2-Sulfo-4-[2'-nitro-4'-(β-sulfatoethyl-sulfonyl)phenyl-amino]-phenyl | greenish navy (632) |
| 12 | 2-Sulfo-4-(β-sulfato-ethylsulfonyl)-5-methoxyphenyl | 2-Sulfo-5-[2'-nitro-4'-(β-sulfatoethyl-sulfonyl)phenyl-amino]phenyl | navy (625) |
| 13 | 4-(β-Sulfatoethyl-sulfonyl)-2-methoxy-5-methylphenyl | 2-Sulfo-4-[2'-nitro-4'-(β-sulfatoethyl-sulfonyl)phenyl-amino]phenyl | navy (635) |
| 14 | 4-Sulfophenyl | 2-Sulfo-5-[2'-nitro-4'-(β-sulfatoethyl-sulfonyl)phenyl-amino]phenyl | navy (593) |
| 15 | 4-Sulfophenyl | 2-Sulfo-4-[2'-nitro-4'-(β-sulfatoethyl-sulfonyl)phenyl-amino]phenyl | navy (603) |
| 16 | 2-Sulfo-4-chloro-phenyl | 2-Sulfo-5-[2'-nitro-4'-(β-sulfatoethyl-sulfonyl)phenyl-amino]phenyl | navy (603) |
| 17 | 2-Sulfophenyl | 2-Sulfo-5-[2'-nitro-4'-(β-sulfatoethyl-sulfonyl)phenyl-amino]phenyl | navy (598) |
| 18 | 2-Chloro-4-(β-sul-fatoethylsulfonyl)-phenyl | 2-Sulfo-5-[2'-nitro-4'-(β-sulfatoethyl-sulfonyl)phenyl-amino]phenyl | navy (615) |
| 19 | 2,6-Dibromo-4-(β-sul-fatoethylsulfonyl)-phenyl | 2-Sulfo-4-[2'-nitro-4'-(β-sulfatoethyl-sulfonyl)phenyl-amino]phenyl | reddish navy (582) |
| 20 | 2,5-Disulfophenyl | 2-Sulfo-5-[2'-nitro-4'-(β-sulfatoethyl-sulfonyl)phenyl-amino]phenyl | navy (606) |
| 21 | 2,5-Disulfophenyl | 2-Sulfo-4-[2'-nitro-4'-(β-sulfatoethyl-sulfonyl)phenyl-amino]phenyl | navy (617) |
| 22 | 2-Sulfo-4-methyl-phenyl | 2-Sulfo-5-[2'-nitro-4'-(β-sulfatoethyl- | navy (598) |

-continued

| | Disazo compound according to formula (A) | | |
|---|---|---|---|
| Ex. | Radical $D^3$- | Radical $D^4$- | Hue |
| 23 | 2-Sulfo-5-[2'-nitro-4'-($\beta$-sulfatoethyl-sulfonyl)phenyl-amino]phenyl | sulfonyl)phenyl-amino]phenyl 2-Sulfo-5-[2'-nitro-4'-($\beta$-sulfatoethyl-sulfonyl)phenyl-amino]phenyl | navy (615) |

What is claimed is:

1. A disazo compound conforming to the formula

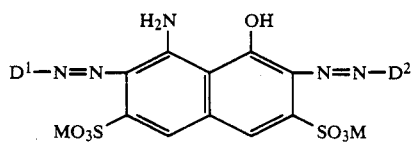

in which

M is hydrogen or an alkali metal or one of equivalent of an alkaline earth metal;

$D^1$ is a group of the formula

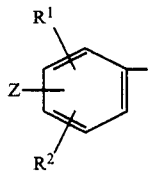

on which $R^1$ is hydrogen, chlorine, bromine, sulfo, alkyl of 1 to 4 carbon atoms or alkoxy of 1 to 4 carbon atoms,
$R^2$ is hydrogen, chlorine, bromine, sulfo, alkyl of 1 to 4 carbon atoms or alkoxy of 1 to 4 carbon atoms and
Z is a group of the formula X-SO$_2$- in which X denotes vinyl or $\beta$-sulfatoethyl;

$D^2$ is a group of the formula

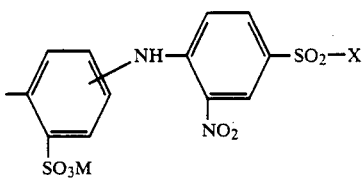

in which M and X have one of the abovementioned meanings and the amino group —NH— is bound to the benzene ring in the para-position with respect to the sulfo group —SO$_3$M or in the para-position with respect to the free bond; the groups $D^1$ and $D^2$ and the groups $R^1$ and $R^2$ and also the two X's are identical to one another or different from one another.

2. The compound as claimed in claim 1, wherein X is $\beta$-sulfatoethyl.

3. The compound as claimed in claim 1, wherein $D^1$ is a group of the formula

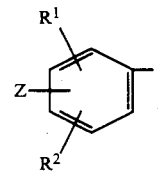

in which Z stands for the group of the formula X—SO$_2$— in which X has the meaning mentioned in claim 1 and $R^1$ denotes hydrogen or methoxy and $R^2$ denotes hydrogen, chlorine, methyl or methoxy.

4. The compound as claimed in claim 7, wherein X is $\beta$-sulfatoethyl.

5. The compound as claimed in claim 1, wherein $D^1$ is 4-($\beta$-sulfatoethylsulfonyl)phenyl and $D^2$ is 2-sulfo-5-[2'-nitro-4'-($\beta$-sulfatoethylsulfonyl)phenylamino]phenyl.

* * * * *